United States Patent Office 3,459,495
Patented Aug. 5, 1969

3,459,495
METHOD FOR THE REMOVAL OF HYDROGEN SULFIDE IN THE AIR OF WASTE GAS
Suetoshi Iida, Yokohama-shi, Yoshio Marushima, Ichikawa-shi, and Nobuyasu Hasebe, Tokyo, Japan, assignors to Tokyo Gas Kabushiki Kaisha, Tokyo, Japan, a corporation of Japan
No Drawing. Filed Nov. 4, 1965, Ser. No. 506,399
Claims priority, application Japan, Apr. 14, 1965, 40/21,622
Int. Cl. B01d 53/34; C01b 17/04
U.S. Cl. 23—2   5 Claims

ABSTRACT OF THE DISCLOSURE

Method of desulfurizing gases containing hydrogen sulfide wherein said gases are contacted with an aqueous alkaline solution containing a material having an oxidation-reduction potential in aqueous solution at 25° C. of from 0.45 v. to 0.70 v. in the presence of molecular oxygen thereby simultaneously to desulfurize the gas and regenerate the absorbent solution. Exemplary of such materials are certain derivatives of naphthoquinone, anthraquinone and phenanthrene and their salts such as sodium-1,4-naphthoquinone-2-sulfonate.

---

The present invention relates to a method for the desulfurization of the air or various waste gases containing hydrogen sulfide.

Air pollution has recently come to be a serious problem. One of the main causes of air pollution is hydrogen sulfide. The waste gas from a sulfur-recovering apparatus by the Claus process contains hydrogen sulfide. The combustible gas from the fermentative treatment of feces, urine and other waste products also contains hydrogen sulfide. The combustion of these waste gases also causes air pollution. Therefore, it is desirable to provide an effective and economical method for the removal of hydrogen sulfide from the air or various waste gases.

The present invention relates to a method by which hydrogen sulfide is removed from the air or combustible gases by the wet process, is recovered as sulfur.

The present invention is characterized by employing, as an absorption liquid, an aqueous solution of the catalytic compound of which the normal oxidation-reduction potential ($E_o$) is in the range from 0.45 to 0.70 v. by the introduction of an acidic radical into quinones, hydroquinones or their salts.

The compound employable as a catalyst in the present invention is water-soluble and is not polymerizable. The catalyst is prepared by the introduction of an acidic radical into quinones, hydroquinones or their salts.

The above described compound is obtained by the introduction of the following acidic radicals into quinones, hydroquinones, or their salts: (a) sulfonic radical (—HSO$_3$)

(b) carboxylic radical (—COOH); (c) alkali metal salt, alkaline earth metal salt, primary ammonium salt and quaternary ammonium salt of sulfonyl or carboxyl radical (for example, —NaSO$_3$, —COONa, —NH$_3$SO$_4$); (d) thioglycolyl radical (—S—CH$_2$—COOH); (e) thiolyl radical (—SR) wherein R is an an alkyl group. The above radicals are called an acidic radical hereafter.

The catalytic compounds employable in the present invention can be represented by the following general formulae:

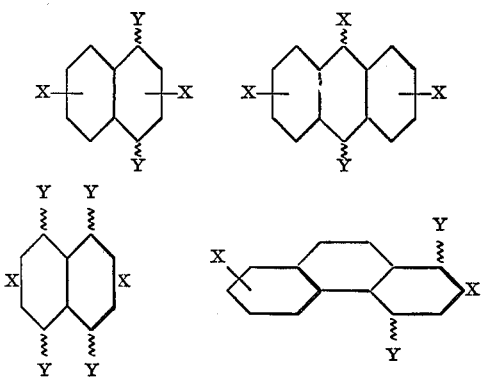

(wherein X is an acidic radical as described above, and Y is a member selected from the group consisting of an oxygen atom or a hydroxyl radical. Y may have the α-configuration or the β-configuration.)

The preferable examples of the catalytic compounds employable in the present invention are as follows:
(1) Naphthoquinone derivatives:

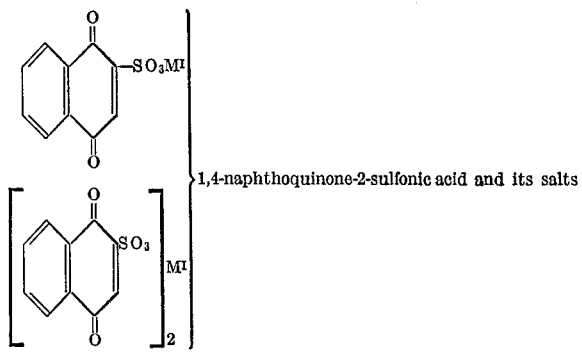

1,4-naphthoquinone-2-sulfonic acid and its salts

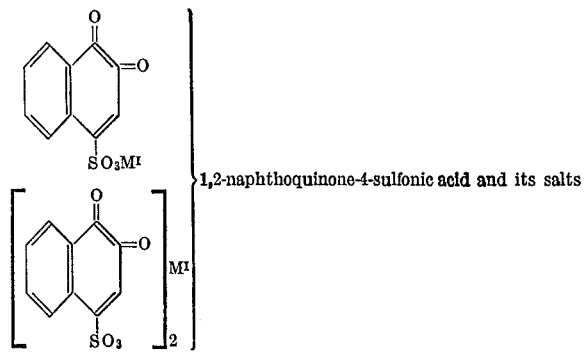

1,2-naphthoquinone-4-sulfonic acid and its salts

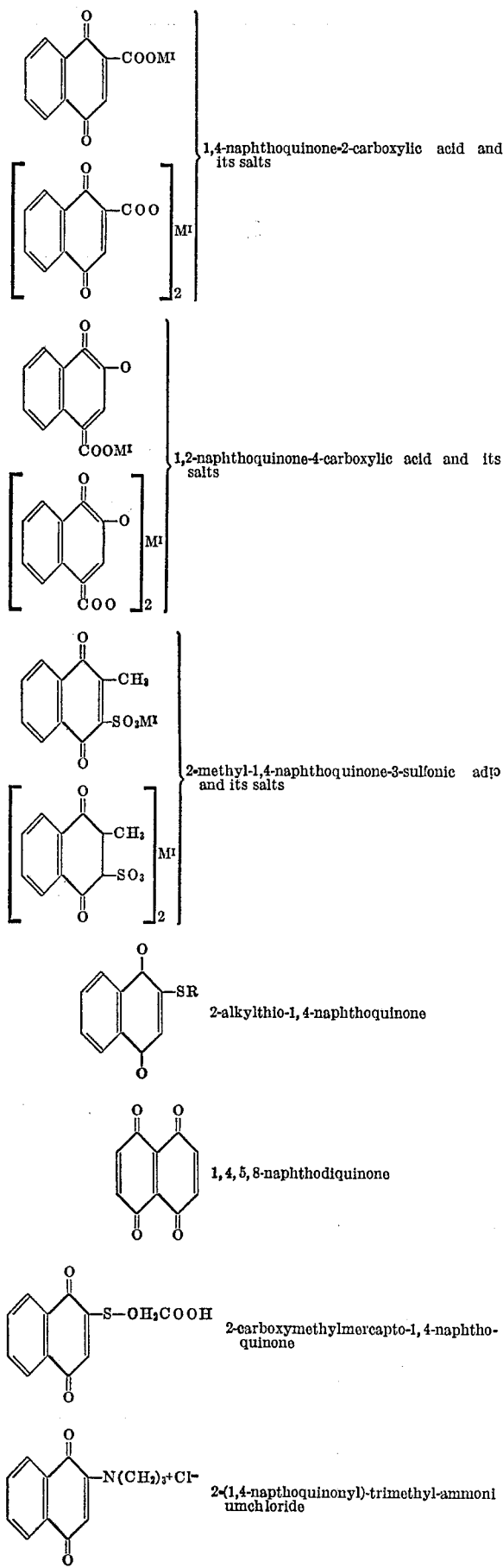

(2) Anthraquinone derivatives:

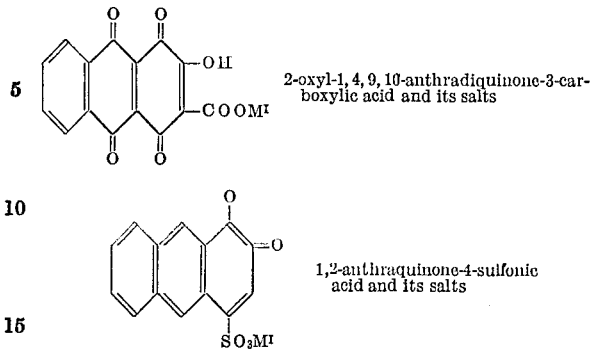

(3) Phenanthrene derivatives:

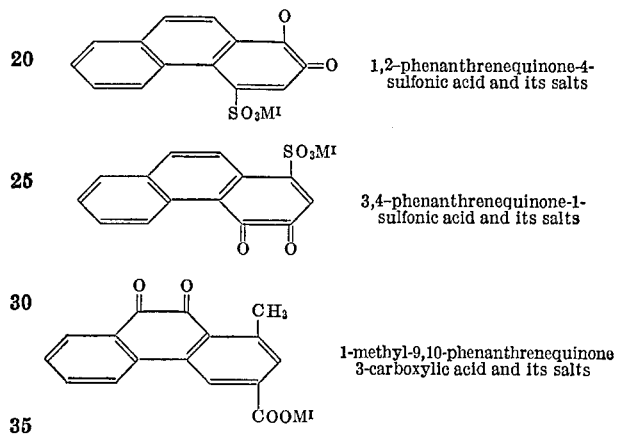

where $M^I$ is a member selected from the group consisting of a hydrogen atom, an ammonium radical, an alkali metal atom, and an alkaline earth metal atom; and R is an alkyl radical.

Quinones change easily to their corresponding hydroquinones in the presence of a reducing agent as shown by the following formula. As this reaction is reversible, hydroquinones corresponding to the quinones above described can be employed as the catalyst in the present invention.

For example, the reversible reaction below can happen easily.

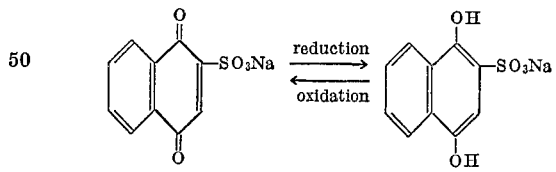

The present invention utilizes the above reversible reaction of the catalytic compounds. The catalyst in the oxidized state oxidizes hydrogen sulfide to sulfur (the catalyst itself is reduced) and then the reduced catalyst is oxidized by oxygen in the air into an oxidized catalytic compound capable of oxidizing hydrogen sulfide. Therefore, the catalytic compounds employable in the present invention must be easily reduced by hydrogen sulfide, and the reduced catalytic compound must be easily oxidized by the air.

It has been discovered that the above properties of the catalytic compounds are exhibited satisfactorily when the oxidation-reduction potential ($E_o$) of the catalytic compounds is in the range from 0.45 v. to 0.70 v.

That is, a substance having an oxidation-reduction potential greater than 0.75 v. (in the aqueous solution at 25° C.), for example, catechol

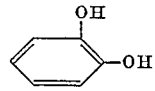

can hardly be oxidized by the air. A substance having an $E_o$ value below 0.45 v. (in the aqueous solution at 25° C.), for example, sodium 3-chloromonoazobenzene-4'-sulfonate, can be easily oxidized by the air, but cannot be reduced by hydrogen sulfide. These substances having $E_o$ below 0.45 v. or over 0.75 v. are not suitable as the catalyst.

The relation between the normal oxidation-reduction potential of the catalytic compounds employable in the present invention and other relating compounds, and the deposition of sulfur is shown in the following table.

formed in the solution to deposit sulfur at the same time. The reduced compound sodium 1,4-dihydroxynaphthalene-2-sulfonate is oxidized again into its quinone-type compound, sodium-1,4-naphthoquinone-2-sulfonate, by oxygen dissolved in the absorption liquid, and again takes part in the oxidation of hydrogen sulfide in the absorption liquid.

Example 1

About three quarters of the desulphurization tower of hard vinyl chloride (inner diameter, 100 m./m.; height, 2000 m./m.; internal volume, 15.7 liters) is packed with

| Redox substance | | | |
|---|---|---|---|
| Oxidized | Reduced | $E_o$ | Sulfur |
| Orthobenzoquinone | Pyrocatechol | 0.787 (25° C.) | No deposition. |
| Para benzoquinone | Hydroquinone | 0.699 (25° C.) | Little deposition. |
| 3-oxy ortho benzoquinone | Pyrogallor | 0.713 (30° C.) | Do. |
| Sodium 3,4-phenanthrenequinone-1-sulfonate | Sodium 3,4-phenanthrenehydroquinone-1-sulfonate. | 0.677 (25° C.) | Deposition. |
| Sodium 1,2-naphthoquinone-4-sulfonate | Sodium 1,2-naphthohydroquinone-4-sulfonate | 0.628 (25° C.) | Do. |
| Sodium 1,4-naphthoquinone-2-sulfonate | Sodium 1,4-naphthohydroquinone-4-sulfonate | 0.533 (25° C.) | Do. |
| Methylene blue | Methylene white | 0.532 (30° C.) | Deposition (difficult on occasions). |
| Sodium 9,10-anthraquinone-2-sulfonate | Sodium 9,10-anthrahydroquinone-2-sulfonate | 0.187 (25° C.) | No deposition. |
| Sodium azobenzene-4,4'-sulfonate | Sodium hydrazobenzene-4,4'-sulfonate | 0.424 (25° C.) | Do. |
| Sodium 1,2-anthraquinone-4-sulfonate | Sodium 1,2-anthrahydroquinone-4-sulfonate | | Little deposition. |
| 1,4-naphthoquinone-2,3-dicarboxylic acid | 1,4-naphthohydroquinone-2,3-dicarboxylic acid. | | Do. |
| Sodium-3-chloro-4-hydroxyazobenzene-4'-sulfonate. | Sodium 3-chloro-4-hydroxy-hydrazobenzene-4'-sulfonate. | 0.435 (25° C.) | Deposition. |

The catalytic compounds must not have the polymerization properties during the reaction. In fact, the compounds having the oxidation-reduction potential above defined can hardly be recognized to have the polymerizability.

The method according to the present invention can be performed in the following form: that is, the aqueous solution of the above catalytic compound is prepared in a container into which gas containing hydrogen sulfide is introduced in the presence of oxygen or the air. Hydrogen sulfide dissolved in the solution reacts with the catalytic compound to deposit sulfur, while the catalytic compound is reduced into the hydroquinone-type compound. The hydroquinone-type catalytic compound, as soon as it is produced, is oxidized by oxygen in the solution so that the quinone-type compound is regenerated. Namely, as the reduction and the oxidation of the catalytic compound happen simultaneously in this method, it can be performed in a single apparatus.

The absorption liquid employable in this method contains preferably an amount in the range of 1/1000 mol to 1/2 mol of the above catalytic compound per liter of the solution.

This method can be operated at a room temperature. This reaction can be conducted under an atmospheric pressure or an increased pressure.

An example of the desulphurization process by this method is as follows: The absorption tower packed with or without wooden hurdles, Raschig rings, hurdles etc. is filled with the aqueous solution of the catalytic compound for example, sodium 1,4-naphthoquinone-2-sulfonate, into which the mixture of the air or gas containing hydrogen sulfide with oxygen or the air is blown through nozzles at the bottom of the absorption tower. After the removal of hydrogen sulfide, the treated gas leaves at the top of the tower. A part of the absorption liquid is taken out from a part of the absorption tower, passed through a filter press for the removal of suspended sulfur and recycled again to the absorption tower. The catalytic compound, sodium 1,4-naphthoquinone-2-sulfonate is reduced to sodium 1,4-dihydroxynaphthalene-2-sulfonate (hydroquinone type) by hydrosulfide ion ceramic Raschig rings (10 m./m.). Then the absorption liquid containing 125 mol/m.³ of $Na_2CO_3$, 250 ml./m.³ of $NaHCO_3$ and 2 mol/m.³ of the catalytic compound, sodium 1,4-naphthoquinone-2-sulfonate is introduced in the desulphurization tower. When the air containing 64 g./m.³ of hydrogen sulfide is blown into the desulphurization tower at the rate of 12 l./hr., the desulphurization ratio gained is over 99.9%. This experiment is conducted at a room temperature of 25° C.

Example 2

About three quarters of the desulfurization tower of hard vinyl chloride (inner diameter, 100 m./m.; height, 2000 m./m.; internal volume, 15.7 liters) is packed with ceramic Raschig rings (10 m./m.). Then the absorption liquid containing 100 ml./m.³ of $Na_2CO_3$ and 5 mol/m.³ of catalytic compound, sodium 1,4-naphthoquinone-2-sulfonate, is introduced in the desulfurization tower. The gas of the waste-treating station containing 32 g./m.³ of hydrogen sulfide, 30% by volume of $CO_2$, 10% by volume of $H_2$ and 55% by volume of $CH_4$ is mixed preliminarily with the volume of the air being three times that of said gas. When this mixture is blown through the desulphurization tower at the rate of 10 l./hr., the desulphurization ratio gained is over 98%.

We claim:

1. A method for the desulfurization of hydrogen sulfide-containing gases comprising passing such gases through an aqueous alkaline medium containing sodium 1,4-naphthoquinone-2-sulfonate in the presence of molecular oxygen thereby to desulphurize the hydrogen sulfide-containing gases and at the same time to regenerate the used sodium 1,4-naphthoquinone-2-sulfonte.

2. A method according to claim 1, wherein said sodium 1,4-naphthoquinone-2-sulfonate is present in an amount between 1/1000 mol to 1/2 mol in the alkaline aqueous medium.

3. A method according to claim 1, wherein said hydrogen sulfide-containing gases to be desulfurized is air contaminated with hydrogen sulfide.

4. A method according to claim 1, wherein said hydrogen sulfide-containing gases is an exhaust gas from a chemical plant.

5. A method according to claim 1, wherein said alkaline aqueous medium contains sodium hydroxide.

References Cited

UNITED STATES PATENTS

| | | | |
|---|---|---|---|
| 2,819,950 | 1/1958 | Patton | 23—225 |
| 2,911,438 | 11/1959 | Szombathy | 23—225 X |
| 3,035,889 | 5/1962 | Nicklin et al. | 23—2 |

FOREIGN PATENTS 841,610  7/1960  Great Britain.

OSCAR R. VERTIZ, Primary Examiner

E. C. THOMAS, Assistant Examiner

U.S. Cl. X.R.

23—4, 225